United States Patent
He

(10) Patent No.: US 10,670,309 B2
(45) Date of Patent: Jun. 2, 2020

(54) THERMO-MAGNETIC COOLING SYSTEM AND ELECTRONIC APPARATUS

(71) Applicant: Lenovo (Beijing) Co., Ltd., Haidian District, Beijing (CN)

(72) Inventor: Xiao He, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 1003 days.

(21) Appl. No.: 14/980,025

(22) Filed: Dec. 28, 2015

(65) Prior Publication Data

US 2017/0074554 A1    Mar. 16, 2017

(30) Foreign Application Priority Data

Sep. 14, 2015  (CN) .......................... 2015 1 0583460

(51) Int. Cl.
F25B 21/00  (2006.01)

(52) U.S. Cl.
CPC ............... *F25B 21/00* (2013.01); *Y02B 30/66* (2013.01)

(58) Field of Classification Search
CPC ................................ F25B 21/00; Y02B 30/66
See application file for complete search history.

(56) References Cited

U.S. PATENT DOCUMENTS

| | | | | |
|---|---|---|---|---|
| 4,805,692 | A * | 2/1989 | Palmer ................. | B01D 1/0082 165/110 |
| 7,063,802 | B2 * | 6/2006 | Tsuda ....................... | H01F 1/44 252/62.52 |
| 7,209,355 | B2 * | 4/2007 | Koga ....................... | G06F 1/203 361/699 |
| 2004/0093877 | A1 * | 5/2004 | Wada ....................... | F25B 21/00 62/114 |
| 2013/0148301 | A1 * | 6/2013 | Dede ....................... | F25B 21/00 361/702 |

FOREIGN PATENT DOCUMENTS

| | | |
|---|---|---|
| CN | 101795548 A | 8/2010 |
| CN | 103503226 A | 1/2014 |

OTHER PUBLICATIONS

Office Action, and English language translation thereof, in corresponding Chinese Application No. 201510583460.6, dated Apr. 21, 2017, 11 pages.

Second Office Action (10 pages including English translation) dated Jan. 4, 2018 from Chinese priority Application No. 201510583460.6.

* cited by examiner

*Primary Examiner* — Jianying C Atkisson
*Assistant Examiner* — Jose O Class-Quinones
(74) *Attorney, Agent, or Firm* — Brinks Gilson & Lione; John C. Freeman

(57) ABSTRACT

A thermo-magnetic cooling system and an electronic apparatus including the thermo-magnetic cooling system are described. The thermo-magnetic cooling system includes a heat source and a liquid cooling device. Heat emitted from the heat source is transferred to the liquid cooling device and fluid circulates in the liquid cooling device to dissipate heat. The fluid is a magnetic fluid that can be magnetized and demagnetized. A part of the liquid cooling device is provided with an external magnetic field so as to magnetize the magnetic fluid.

6 Claims, 3 Drawing Sheets

THERMO-MAGNETIC COOLING SYSTEM AND ELECTRONIC APPARATUS

This application claims priority to Chinese Patent Application No. 201510583460.6 filed on Sep. 14, 2015, the entire contents of which are incorporated herein by reference.

BACKGROUND

The present disclosure relates to a thermo-magnetic cooling system, and more specifically, to a cooling system using heat and magnetism in combination.

Thermo-magnetic effect refers to such an phenomenon in which refrigeration working substance emits heat to the outside during isothermal magnetization (as shown in FIG. 1(b)), but its temperature will be reduced during adiabatic demagnetization so as to absorb heat from the outside (as shown in FIG. 1(c)). Here the refrigeration working substance means solid magnetic materials. Substance is composed of atoms, an atom is composed of electrons and an atomic nucleus, an electron possesses spin magnetic moment as well as orbital magnetic moment, so that the atoms or ions of such substances have magnetic moment. Ions or atoms of the paramagnetic materials have their magnetic moment chaotic when no external magnetic field is applied, and when an external magnetic field is applied, the magnetic moment of an atom is arranged in the orientation of the external magnetic field, so that the magnetic moment is ordered to emit heat outward; whereas, once the external magnetic field is removed, the magnetism of the material system is decreased orderly and the material system would absorb heat from the outside. If the process of demagnetizing and heat absorption and the process of magnetizing and heat dissipation are connected by a circulation, the external magnetic field could cause the magnetic material to absorb heat at one end and release heat at the other end so as to achieve the purpose of refrigerating.

SUMMARY

The present disclosure utilizes aforesaid thermo-magnetic effect in such a way that the thermo-magnetic effect and ordinary dissipate heat are combined to reach a higher heat dissipation efficiency.

The present disclosure provides a thermo-magnetic cooling system, its technical solution is: a thermo-magnetic cooling system comprising a heat source and a liquid cooling device, heat emitted from the heat source is transferred to the liquid cooling device, fluid circulates in the liquid cooling device to dissipate heat, wherein the fluid is a magnetic fluid that can be magnetized and demagnetized, a part of the liquid cooling device is provided with an external magnetic field so as to magnetize the magnetic fluid.

Aforesaid technical solution of the present disclosure relates to single-cycle liquid cooling system, in which an external magnetic field is applied to a conventional single-cycle liquid cooling system, and the fluid in the conventional single-cycle liquid cooling system is replace with a magnetic fluid. After heat source and the liquid cooling device exchange heat, the heat emitted from the heat source is transferred to the magnetic fluid in the liquid cooling device, the magnetic fluid circulates in the liquid cooling device, when the magnetic fluid runs through the external magnetic field, the external magnetic field would magnetize the magnetic fluid, the magnetic fluid releases heat outward when being magnetized, then the heat emitted from the magnetic fluid is released outside of the system through the heat dissipation parts of the liquid cooling device, in the present disclosure, the heat dissipation parts being cooling fins, thus the temperature of the magnetic fluid is reduced; when the magnetic fluid flows away from the external magnetic field, the magnetic fluid is subjected to demagnetization, the magnetic fluid absorbing heat from the outside, the temperature around the magnetic fluid is reduced, thereby the temperature of the magnetic fluid is further reduced too, therefore by applying an external magnetic field externally on a conventional single-cycle liquid cooling system, it is possible for the magnetic fluid to reach a greater temperature reduction, thus improving the heat dissipation efficiency.

The heat source and the liquid cooling device are provided with an interface material layer there between, and the interface material layer is used to reduce the thermal resistance between the heat source and the liquid cooling device.

The interface material layer is used to reduce the gap between the liquid cooling device and the heat source, so as to depress the contact thermal resistance between the heat source and the liquid cooling device, and is usually made from heat-conductive silicone grease or materials of higher heat conductivity, for example, heat-conductive pad/layer made from copper and silver.

The liquid cooling device is provided with a pump for pumping the fluid to circulate in the liquid cooling device.

The circulation of the magnetic fluid in the liquid cooling device may be achieved by means of thermal convection of the magnetic fluid itself, however, for the purpose of even better thermo circulation of the magnetic fluid in the liquid cooling device, a pump may also be provided in the liquid cooling device for pumping the fluid to circulate in the liquid cooling device.

The present disclosure also provides a thermo-magnetic cooling system, its technical solution is: a thermo-magnetic cooling system comprising a heat source, a first liquid cooling device and a second liquid cooling device, heat emitted from the heat source is transferred to the first liquid cooling device, the first and second liquid cooling devices constitute a bicirculating liquid cooling system, the first liquid cooling device transfers a part of the heat to the second liquid cooling device, a first fluid circulates in the first liquid cooling device to dissipate heat, a second fluid circulates in the second liquid cooling device to dissipate heat, the first and second fluids are independent from each other, wherein the first fluid and/or the second fluid is (are) magnetic fluid that can be magnetized and demagnetized, a part of the first liquid cooling device and/or the second liquid cooling device is provided with an external magnetic field so as to magnetize the magnetic fluid.

The aforesaid technical solution of the present disclosure relates to a bicirculating liquid cooling system, in which an external magnetic field is provided for the traditional bicirculating liquid cooling system, and at least one of the fluids in the traditional bicirculating liquid cooling system is replace with a magnetic fluid, and an external magnetic field is externally applied upon the magnetic fluid so as to magnetize the magnetic fluid. After the heat source and the liquid cooling device exchange heat, the heat emitted from the heat source is transferred to the first liquid cooling device, the second liquid cooling device and the first liquid cooling device are in a nested arrangement, the first liquid cooling device transfers part of heat to the second liquid cooling device, magnetic fluid is provided in the first liquid cooling device and/or the second liquid cooling device, that is, the magnetic fluid may be provided merely in the first liquid cooling device; the magnetic fluid may be provided merely in the second liquid cooling device; or the magnetic fluid is provided in both the first and second liquid cooling devices; corresponding to the above three arrangement manners for the magnetic fluid, the arrangement manner for the external magnetic field is: the external magnetic field is merely arranged outside of the first liquid cooling device; the external magnetic field is merely arranged outside of the second liquid cooling device; and the external magnetic field is provided outside both the first and second liquid cooling devices.

The principle of applying an external magnetic field for the magnetic fluid to improve the heat dissipation efficiency is identical to that for a single-cycle liquid cooling system, that is, when magnetic fluid runs through the external magnetic field, the external magnetic field magnetizes the magnetic fluid, the magnetic fluid releases heat outward when being magnetized, then the heat emitted from the magnetic fluid is released outside of the system through the heat dissipation parts of the first and/or second liquid cooling devices, in the present disclosure, the heat dissipation parts being cooling fins, thus the temperature of the magnetic fluid is reduced; when the magnetic fluid flows away from the external magnetic field, the magnetic fluid is subjected to demagnetization, the magnetic fluid absorbing heat from the outside, the temperature around the magnetic fluid is reduced, thereby the temperature of the magnetic fluid is further reduced too, therefore, it is possible for the magnetic fluid to reach a greater temperature reduction, thus improving the heat dissipation efficiency.

The heat source and the first liquid cooling device are provided with an interface material layer there between, and the interface material layer is used to reduce the thermal resistance between the heat source and the first liquid cooling device.

The first fluid is not a magnetic fluid, the second fluid is a magnetic fluid, the external magnetic field is only provided onto a part of the second liquid cooling device so as to magnetize the magnetic fluid.

The magnetic fluid is a magnetic fluid working substance of giant magneto caloric effect within a desired temperature range.

The external magnetic field employs a permanent magnet of high magnetic flux density.

The interface material layer is of heat-conductive silicone grease.

The magnetic fluid is such a liquid that ferromagnetic fine powder is steadily dispersed in water, oils, esters or ethers liquid.

The ferromagnetic fine powder is $Fe_3O_4$ nanoparticles, ferromagnetic rare earth metal nanoparticles, GdSiGeZn containing alloy nanoparticles or rare earth containing chemical compounds magnetic nanoparticles.

The first liquid cooling device and the second liquid cooling device are made from materials of high conductivity coefficient.

The first liquid cooling device is provided with a first pump for pumping the first fluid to circulate in the first liquid cooling device, and/or the second liquid cooling device is provided with a second pump for pumping the second fluid to circulate in the second liquid cooling device.

The circulation of the first fluid in the first liquid cooling device as well as the circulation of the second fluid in the second liquid cooling device may be achieved by means of the thermal convection of the magnetic fluid itself, however, for the purpose of even better circulation of the first and second fluids in the first and second liquid cooling devices, a pump may also be provided in the first and second liquid cooling devices for pumping the first and second fluids to circulate in the first and second liquid cooling devices.

The present disclosure also provides an electronic apparatus having aforesaid thermo-magnetic cooling system.

The heating elements of the electronic apparatus are used as the heat source of the thermo-magnetic cooling system.

With aforesaid thermo-magnetic cooling system and the electronic apparatus having such a thermo-magnetic cooling system, the thermo-magnetic effect can be utilized to improve the heat dissipation efficiency.

BRIEF DESCRIPTION OF THE DRAWINGS

Other advantages and features of the present disclosure will become even more clear and apparent from the following description about special embodiments of the present disclosure given only by way of nonrestrictive examples and illustrated in the drawings, in which.

REFERENCE NUMERALS

Figure 1:
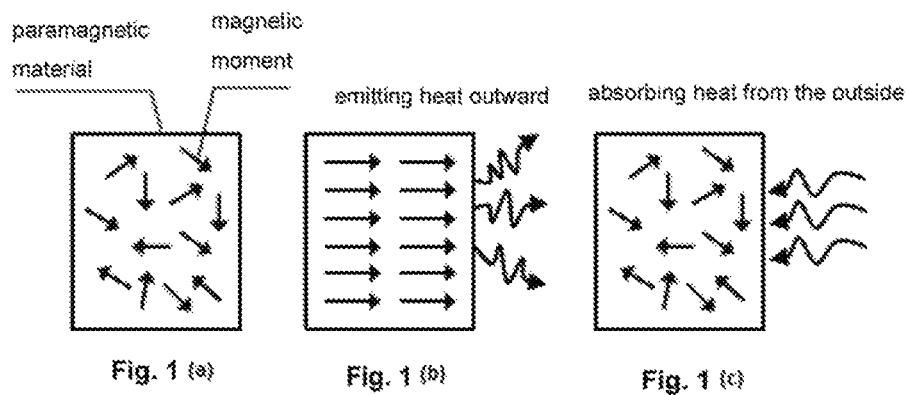
FIG. 1(a), 1(b) and 1(c) illustrate respectively the initial state of the paramagnetic material when no external magnetic field is applied, the magnetized state when the external magnetic field is applied, and the demagnetized state when getting away from the external magnetic field.

1. Cooling fin
2. Fluid
3. Interface material layer
4. Heat source
5. First pump
6. Second pump
7. Internal circulation
8. External circulation
9. Heat exchanger
10. External magnetic field
11. First fluid
12. Second fluid
13. Magnetic fluid

DETAILED DESCRIPTION

In a liquid cooling systems, in which no external magnetic fields and magnetic fluid are used, the fluid is always utilize in such a way that the fluid absorbs heat at the hot end and releases heat at the cold end so as to perform heat transfer.

Figure 2:
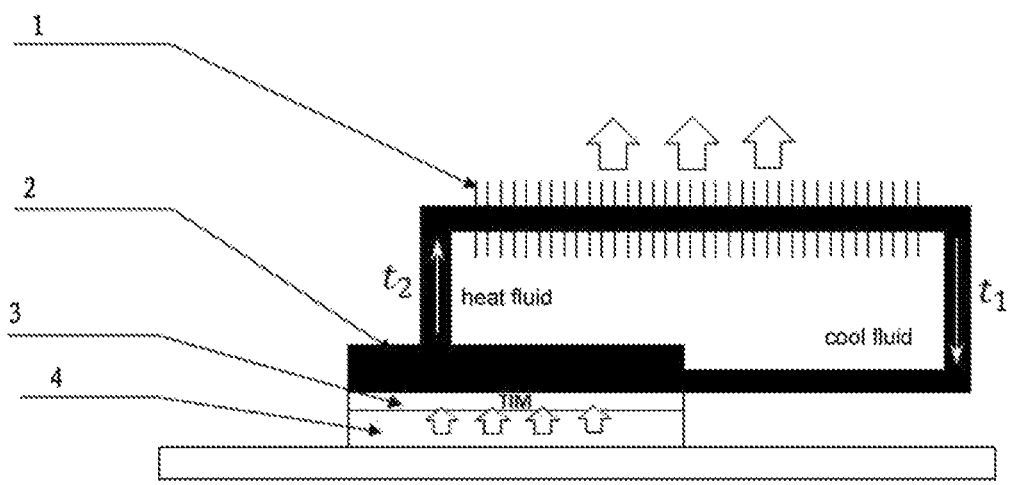
FIG. 2 shows a single-cycle liquid cooling system without external magnetic field and no magnetic fluid being used.
Figure 3:
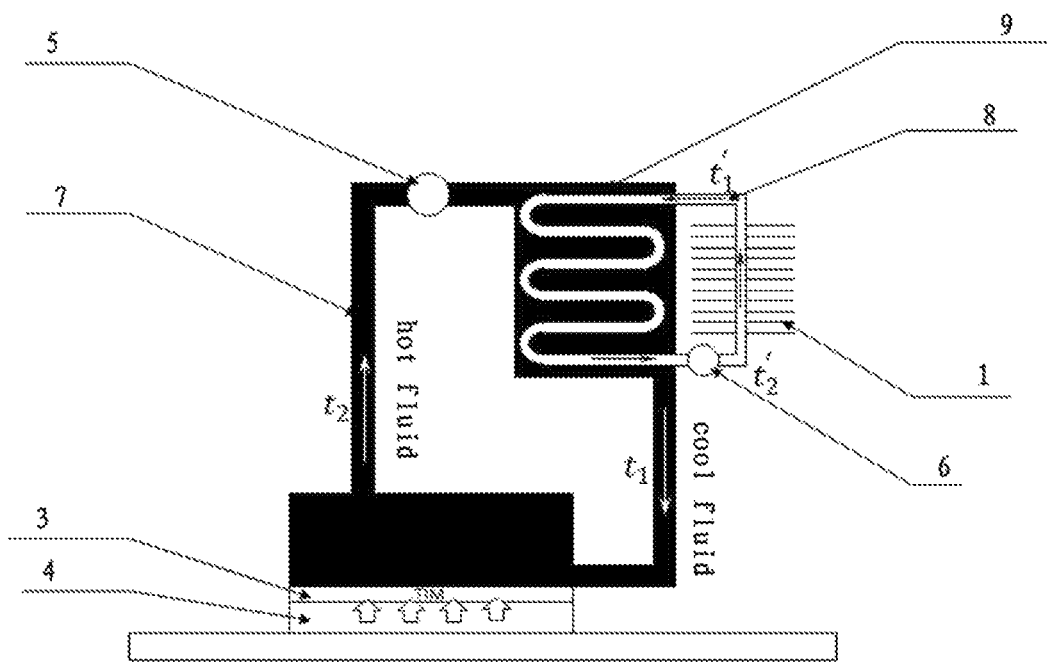
FIG. 3 shows a bicirculating liquid cooling system without external magnetic field and no magnetic fluid being used.

For example, as to a single-cycle liquid cooling system (as shown in FIG. 2), its heat transfer capability is: $Q=q \times C_1 \times (t_2-t_1)$, wherein q is the circulation volume, C is the specific heat, t2 is the hot fluid temperature, t1 is the cold fluid temperature;

For example, as to a bicirculating liquid cooling system (as shown in FIG. 3), its heat transfer capability is: $Q=q \times C_1 \times (t_2-t_1)=q' \times C_2 \times (t'_2-t'_1)$, wherein q and q' are Internal and external circulation volumes, $C_1$ and $C_2$ are Specific heat capacities of the internal and external circulating fluids, $t^2$ and $t'_2$ are temperatures of the internal and external circulation hot fluids, $t_1$ and $t'_1$ are temperatures of the internal and external circulation cold fluids.

A detailed description about the thermo-magnetic cooling system of the present disclosure will be given in conjunction with FIGS. 4 to 6.

Figure 4:
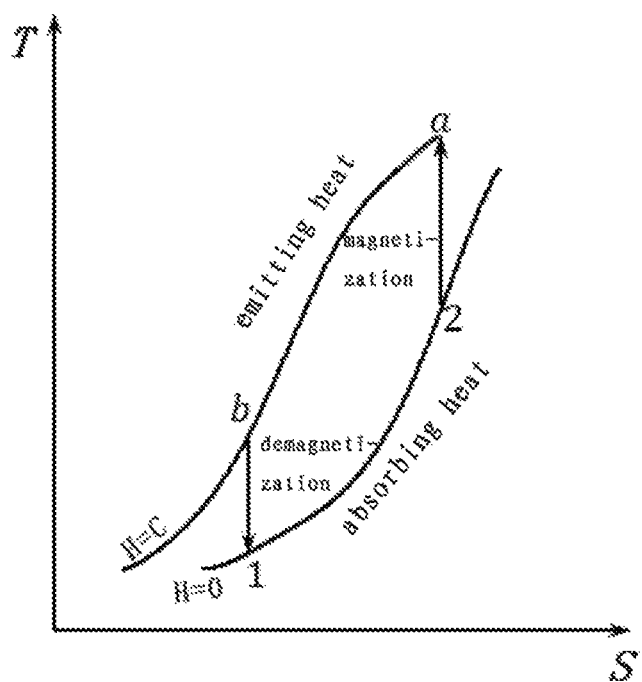
FIG. 4 illustrates the relationship between the temperature and the thermal entropy of the magnetic fluid in the process from magnetization to demagnetization, in which x coordinate S means the thermal entropy, y coordinate T means the temperature.

FIG. 4 illustrates the relationship between the temperature and the thermal entropy of the magnetic fluid in the process from magnetization to demagnetization, in which x coordinate S means the thermal entropy, y coordinate T means the temperature. In the process of magnetization, the magnetic fluid releases heat outwards, and its temperature decreases, while in the process of demagnetization, the magnetic fluid absorbs heat from the outside so that its temperature rises.

The magnetic fluid used in the present disclosure may be such a liquid in which ferromagnetic fine powders, such as $Fe_3O_4$ nanoparticles, ferromagnetic rare earth metal, alloy (such as GdSiGeZn and similar alloys) and rare earth containing chemical compounds magnetic nanoparticles and the like, are steadily dispersed in a liquid, such as, water, oils, esters, ethers and the like. FIG. 5 illustrates the thermo-magnetic cooling system according to the present disclosure, which is a single-cycle liquid cooling system.

Figure 5:
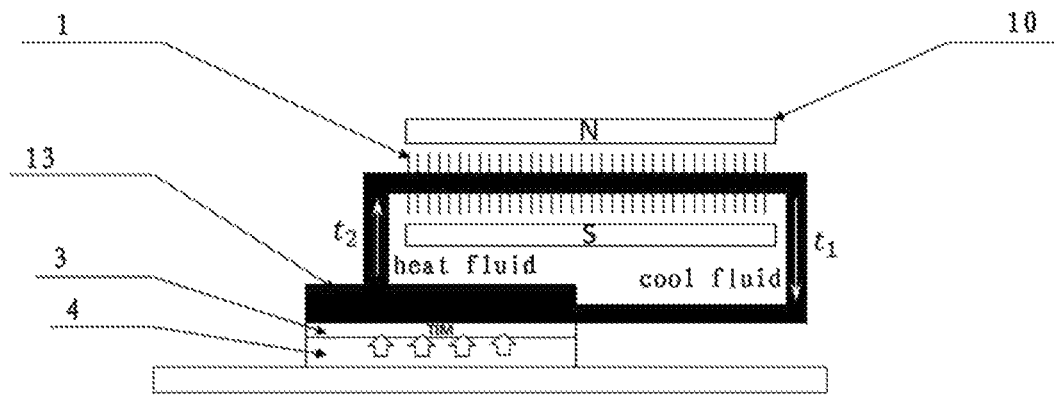
FIG. 5 illustrates the thermo-magnetic cooling system according to the present disclosure, which is a single-cycle liquid cooling system.

The thermo-magnetic cooling system as shown in FIG. 5 comprises a heat source 4 and a liquid cooling device, heat emitted from the heat source 4 is transferred to the liquid cooling device, the magnetic fluid 13 that be magnetized and demagnetized circulates in the liquid cooling device for the purpose of heat dissipation, an external magnetic field 10 is applied to the liquid cooling device to magnetize the magnetic fluid.

In the embodiment shown in FIG. 5, the external magnetic field is arranged at the upper part of the liquid cooling device. The primary heat dissipation part of the liquid cooling device is the cooling fins 1, and the external magnetic field is provided externally of the cooling fins 1. In addition to the manner as shown in this embodiment, the external magnetic field may also be provided at other liquid cooling cyclic parts of the liquid cooling device, whereas, the position as shown in the example of FIG. 5 is the optimal implementation position of the present disclosure, and the external magnetic field being provided external of the cooling fins allows for an optimal heat dissipation effect.

Aforesaid technical solution of the present disclosure relates to single-cycle liquid cooling system, in which an external magnetic field is applied to a conventional single-cycle liquid cooling system, and the fluid in the conventional single-cycle liquid cooling system is replace with a magnetic fluid. After the heat source and the liquid cooling device exchange heat, the heat emitted from the heat source is transferred to the magnetic fluid in the liquid cooling device, the magnetic fluid circulates in the liquid cooling device, when the magnetic fluid runs through the external magnetic field, the external magnetic field would magnetize the magnetic fluid, the magnetic fluid releases heat outward when being magnetized, then the heat emitted from the magnetic fluid is released outside of the system through the heat dissipation parts of the liquid cooling device, in the present disclosure, cooling fins, thus the temperature of the magnetic fluid is reduced; when the magnetic fluid flows away from the external magnetic field, the magnetic fluid is subjected to demagnetization, when the magnetic fluid absorbs heat from the outside, the temperature around the magnetic fluid is reduced, thereby the temperature of the magnetic fluid is further reduced too, therefore by applying an external magnetic field externally on a conventional single-cycle liquid cooling system, it is possible for the magnetic fluid to reach a greater temperature reduction, thus improving the heat dissipation efficiency.

The heat source and the liquid cooling device are provided with an interface material layer there between, and the interface material layer is used to reduce the gap between the liquid cooling device and the heat source, and depress the contact thermal resistance between the heat source and the liquid cooling device. The interface material layer is usually made from heat-conductive silicone grease or highly heat-conductive materials, for example, is heat-conductive pad/layer made from copper and silver.

The circulation of the magnetic fluid in the liquid cooling device may be achieved by means of thermal convection of the magnetic fluid itself, however, for the purpose of even better thermo circulation of the magnetic fluid in the liquid cooling device, a pump (not shown) may also be provided in the liquid cooling device for pumping the fluid pumped to circulate in the liquid cooling device.

Figure 6:
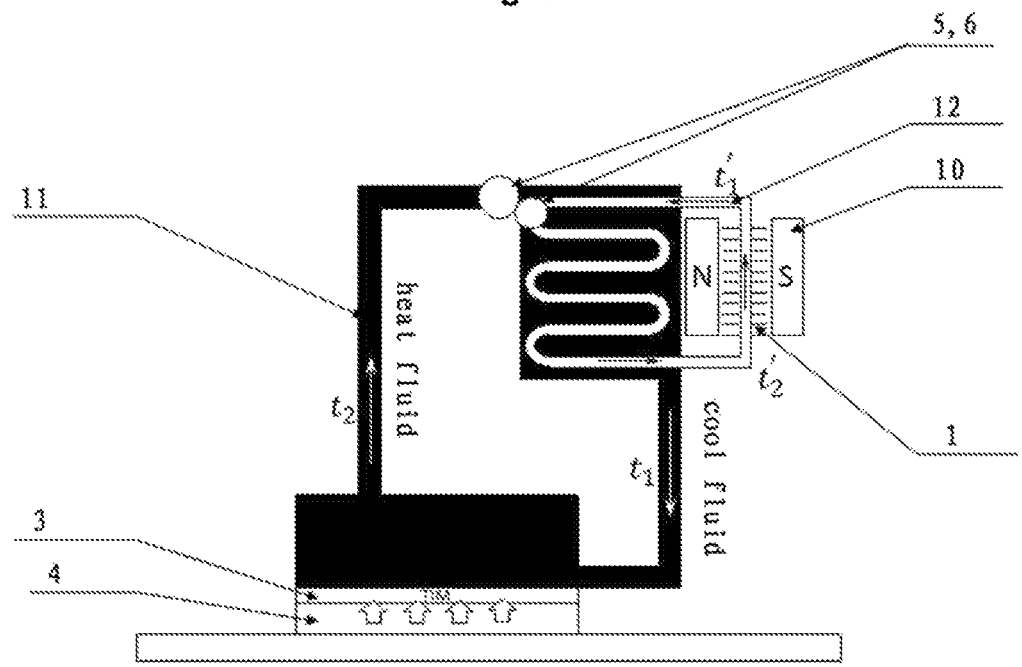
FIG. 6 illustrates the thermo-magnetic cooling system according to the present disclosure, which is a dual-cycle cooling system.

FIG. 6 illustrates the thermo-magnetic cooling system according to the present disclosure, which is a dual-cycle cooling system.

The thermo-magnetic cooling system as shown in FIG. 6 includes a heat source 4, a first liquid cooling device and a second liquid cooling device. The liquid cooling device illustrated by the black part in FIG. 6 is the first liquid cooling device, and the liquid cooling device illustrated by the white part is the second liquid cooling device. The heat emitted from the heat source 4 is transferred to the first liquid cooling device, the second liquid cooling device is nested into the first liquid cooling device; and as a complementation for the first liquid cooling device, the first and second liquid cooling devices constitute a bicirculating liquid cooling system. The first liquid cooling device transfers to a part of the heat to the second liquid cooling device, the first fluid 11 circulates in the first liquid cooling device to dissipate heat, the second fluid 12 circulates in the second liquid cooling device to dissipate heat, the first fluid 11 and the second fluid 12 are independent from each other, and the first fluid 11 and/or the second fluid 12 are magnetic fluids that can be magnetized and demagnetized, there is(are) provided with an external magnetic field 12 to a part of the first liquid cooling device and/or a part of the second liquid cooling device, so as to magnetize the magnetic fluid.

In this embodiment, the first fluid 11 is not a magnetic fluid, the second fluid 12 is a magnetic fluid. The second liquid cooling device is provided with a cooling fin 1, and the external magnetic field 10 is arranged outside of the cooling fin. Arrangement mode and principles for the cooling fin and the external magnetic field are similar to that of the single-cycle thermo-magnetic cooling system; its detailed description is omitted here.

In this embodiment, no magnetic fluid is used in the first liquid cooling device, and the external magnetic field is not provided outside of the first liquid cooling device, so that it is possible to avoid influence of the magnetic fluid and external magnetic field upon the heat source, such an arrangement manner could prevent or ease adverse effect of the magnetic field upon the crystal elements on occasions where the heat source is crystal elements and similar heat dissipation elements that are likely subjected to magnetic field influence.

In addition to the arrangement manner in which only the second liquid cooling device is provided with magnetic fluid as described in this embodiment, it is also possible to arrange the magnetic fluid merely in the first liquid cooling device; or the magnetic fluid is arranged in both the first and second liquid cooling devices; corresponding to the above two arrangement manners for the magnetic fluid, the arrangement manner for the external magnetic field is: the external magnetic field is merely arranged outside of the first liquid cooling device; and the external magnetic field is provided outside both the first and second liquid cooling devices.

The principle of applying an external magnetic field for the magnetic fluid to improve the heat dissipation efficiency is identical to that for a single-cycle liquid cooling system, that is, when magnetic fluid runs through the external magnetic field, the external magnetic field magnetizes the magnetic fluid, the magnetic fluid releases heat outward when being magnetized, then the heat emitted from the magnetic fluid is released outside of the system through the heat dissipation parts of the first and/or second liquid cooling devices, in the present disclosure, cooling fins, thus the temperature of the magnetic fluid is reduced; when the magnetic fluid flows away from the external magnetic field, the magnetic fluid is subjected to demagnetization, when the magnetic fluid absorbs heat from the outside, the temperature around the magnetic fluid is reduced, thereby the temperature of the magnetic fluid is further reduced too, therefore, it is possible for the magnetic fluid to reach a greater temperature reduction, thus improving the heat dissipation efficiency.

For the purpose of improving the thermo circulation of the first fluid 11 in the first liquid cooling device, and for the purpose of improving the thermo circulation of the second fluid 12 in the second liquid cooling device, the first liquid cooling device is provided with a first pump 5 for pumping the first fluid 11 to circulate in the first liquid cooling device, the second liquid cooling device is provided with a second pump 6 for pumping the second fluid 12 to circulate in the second liquid cooling device.

In the present disclosure, the magnetic fluids 13, 12 are magnetic fluid working substances of giant magneto caloric effect within a desired temperature range.

In the present disclosure, the external magnetic field 10 employs a permanent magnet of high magnetic flux density.

In the present disclosure, the magnetic fluids 2, 12 are such a liquid that ferromagnetic fine powder is steadily dispersed in water, oils, esters or ethers liquid.

In the present disclosure, the liquid cooling device, the first liquid cooling device and the second liquid cooling device are all made from materials of high conductivity coefficient.

The present disclosure also provides an electronic apparatus having aforesaid thermo-magnetic cooling system.

The heating elements of the electronic apparatus, such as semiconductor elements, transistor elements, are usually used as the heat source of the thermo-magnetic cooling system; the thermo-magnetic cooling system is arranged closely adjacent to the heating surface of the heating element.

With aforesaid thermo-magnetic cooling system and the electronic apparatus having such a thermo-magnetic cooling system, the thermo-magnetic effect can be utilized to improve the heat dissipation efficiency.

The above provides detail introduction of the present invention, and the variations made by the skilled in this art based on the idea of the embodiment of present invention about particular embodiments and the range of application should not be construed as departing from the protective scope of the present invention, generally speaking, the content of this specification should not be regarded as limiting to the present invention.

The invention claimed is:

1. A thermo-magnetic cooling system comprising:
a heat source; and
a liquid cooling device,
wherein heat emitted from the heat source is transferred to the liquid cooling device, fluid circulates in the liquid cooling device to dissipate heat,
wherein the fluid is a magnetic fluid configured to be magnetized and demagnetized, and a part of the liquid cooling device is provided with an external magnetic field for magnetizing the magnetic fluid,
wherein the magnetic fluid comprises a liquid comprising the following materials dispersed therein: $Fe_3O_4$ nanoparticles, ferromagnetic rare earth metal nanoparticles, GdSiGeZn alloy nanoparticles, and rare earth containing chemical compounds magnetic nanoparticles; and
wherein the external magnetic field is disposed at an upper portion of the liquid cooling device, and a main heat dissipating portion of the liquid cooling device comprises a cooling fin, and the external magnetic field is disposed outside the cooling fin.

2. The thereto-magnetic cooling system according to claim 1, wherein the heat source and the liquid cooling device are provided with an interface material layer there between, and the interface material layer is used to reduce the thermal resistance between the heat source and the liquid cooling device.

3. The thereto-magnetic cooling system according to claim 1, wherein the liquid cooling device is includes a pump to circulate the fluid in the liquid cooling device.

4. The thermo-magnetic cooling system according to claim 1, wherein the heat source comprises an electronic device.

5. The thermo-magnetic-cooling system according to claim 4, wherein the electronic device comprises a semiconductor element.

6. The thereto-magnetic cooling system according to claim 4, wherein the electronic device comprises a transistor element.

* * * * *